United States Patent [19]

Moore et al.

[11] 4,292,806

[45] Oct. 6, 1981

[54] TURBOCHARGER CONTROL SYSTEM

[75] Inventors: M. Samuel Moore; Charles F. Paluka, both of Northridge, Calif.

[73] Assignee: Semco Instruments, Inc., North Hollywood, Calif.

[21] Appl. No.: 15,956

[22] Filed: Feb. 28, 1979

[51] Int. Cl.³ .............................................. F02B 37/12
[52] U.S. Cl. .................................. 60/600; 123/41.11; 415/17; 416/32
[58] Field of Search .................. 60/600, 601, 602, 603, 60/611; 415/13, 17; 416/32, 169 A; 123/41.13, 41.05, 41.11

[56] References Cited

U.S. PATENT DOCUMENTS

| | | | |
|---|---|---|---|
| 1,856,024 | 4/1932 | Buchi | 60/603 |
| 1,934,783 | 11/1933 | Arterburn | 416/32 X |
| 2,444,644 | 7/1948 | Fullemann | 60/600 X |
| 3,150,650 | 9/1964 | Dreesen et al. | 60/611 X |
| 3,173,242 | 3/1965 | Erickson | 60/601 |
| 3,232,043 | 2/1966 | Birmann | 60/611 |
| 3,342,195 | 9/1967 | Wagner | 415/17 X |
| 3,570,240 | 3/1971 | Melchior | 60/600 X |
| 3,925,989 | 12/1975 | Pustelnik | 60/602 |

*Primary Examiner*—Michael Koczo, Jr.
*Attorney, Agent, or Firm*—Poms, Smith, Lande & Rose

[57] ABSTRACT

A diesel engine which may, for example, be a V-12 engine, is provided with a turbocharger having two sections, a turbine section which receives exhaust gases and which drives the associated compressor section. The turbocharger increases the input air pressure to the input manifold of the diesel engine up to several times atmospheric pressure. Both the turbine section and the compressor section of the turbocharger have adjustable vanes to vary the coupling with the exhaust gases, in the case of the turbine section, and with respect to the input air in the case of the compressor. An associated control circuit senses the temperature at the inlet to the turbine (the engine exhaust temperature), the speed of the engine, and the engine inlet manifold pressure, and adjusts the orientation of the turbine and compressor vanes for optimal engine performance, while avoiding cavitation or "stall" conditions in the compressor.

4 Claims, 9 Drawing Figures

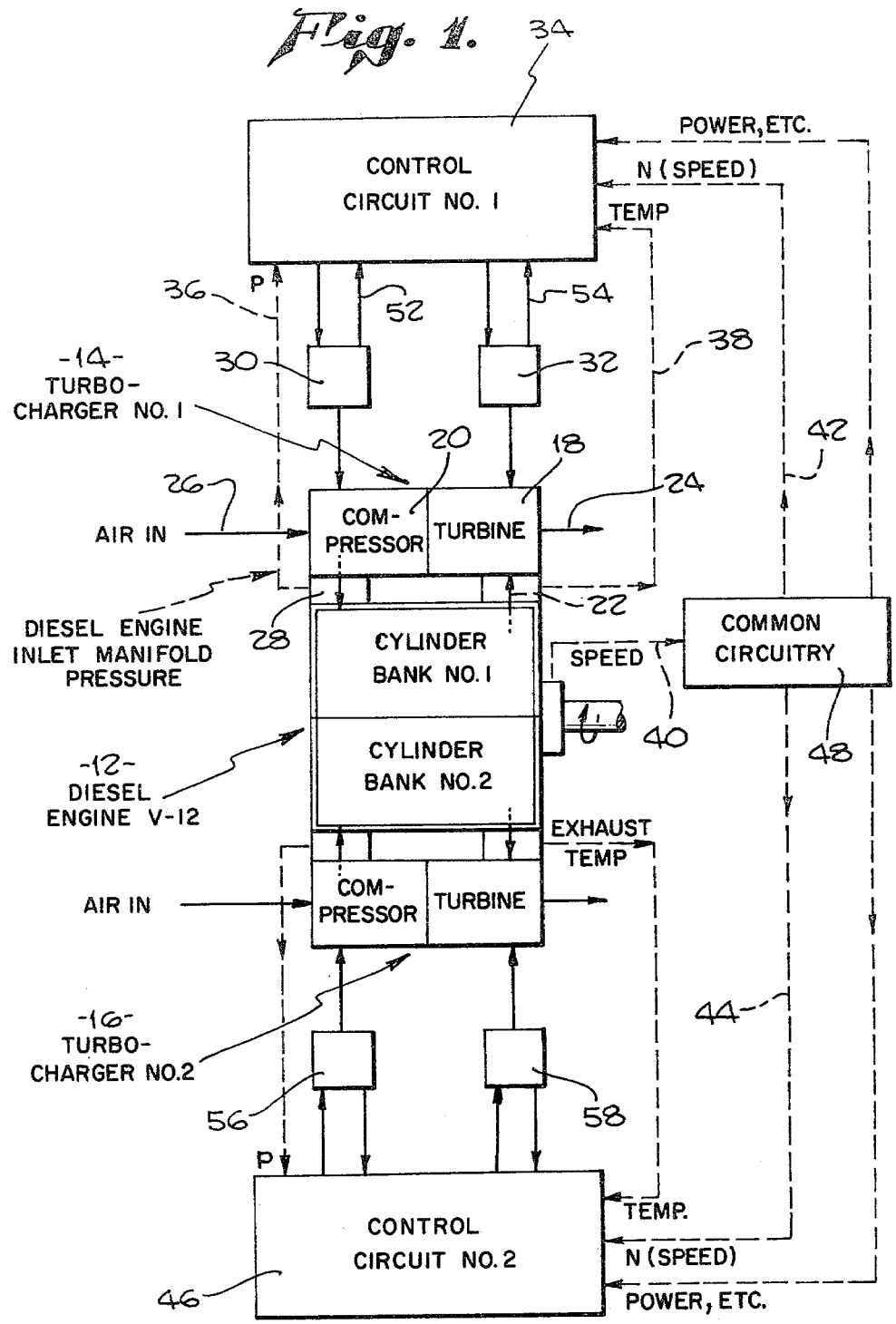

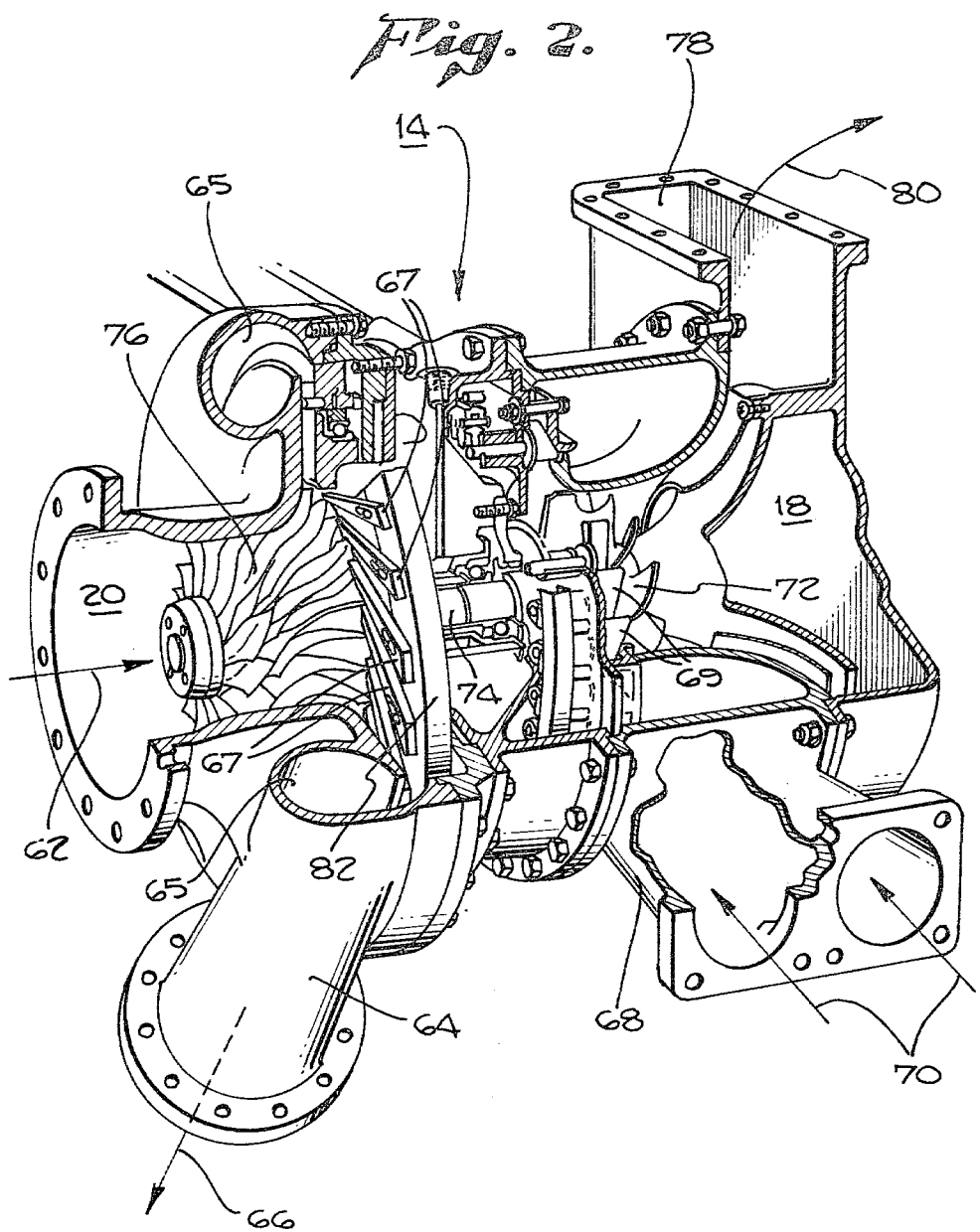

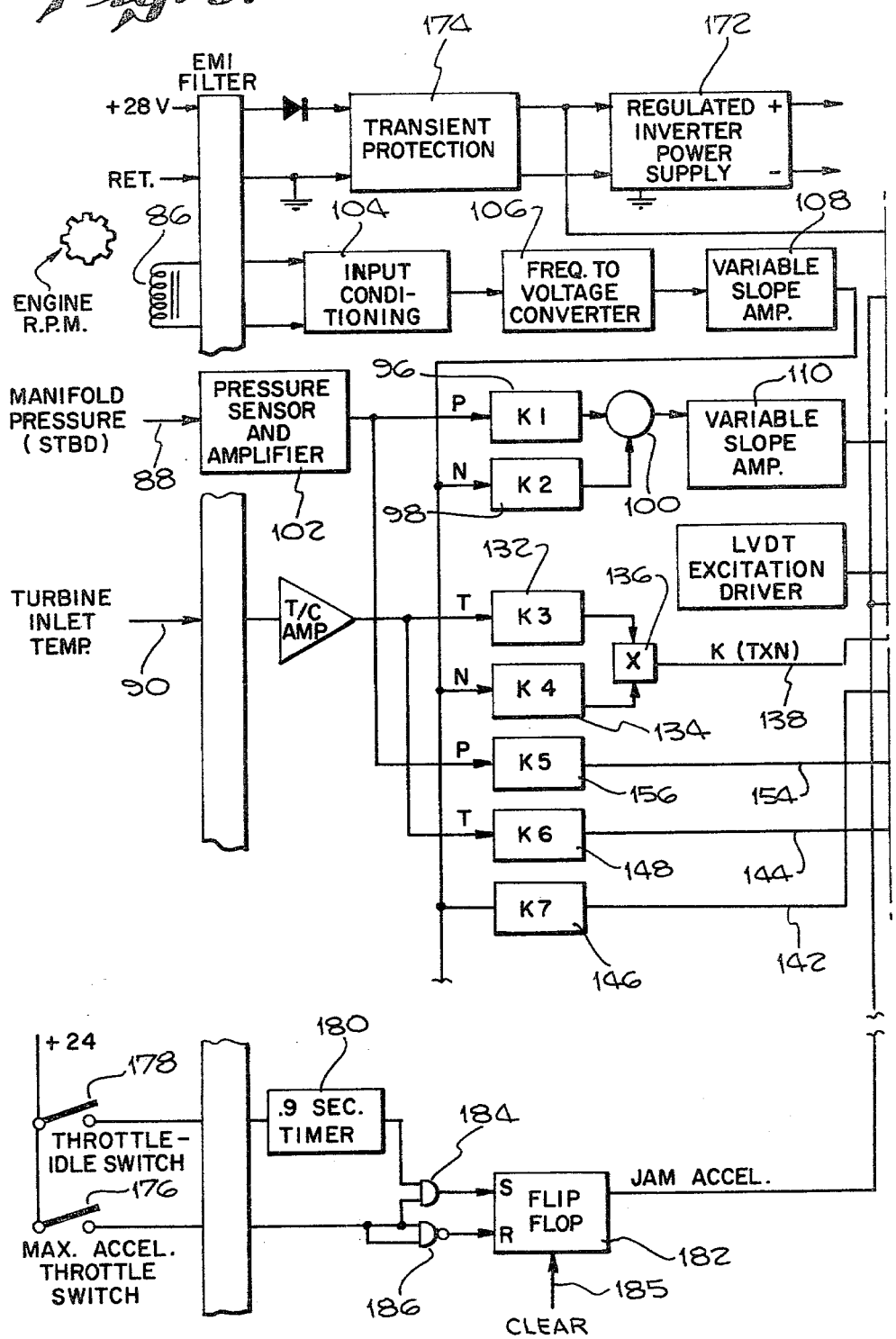
Fig. 3.a

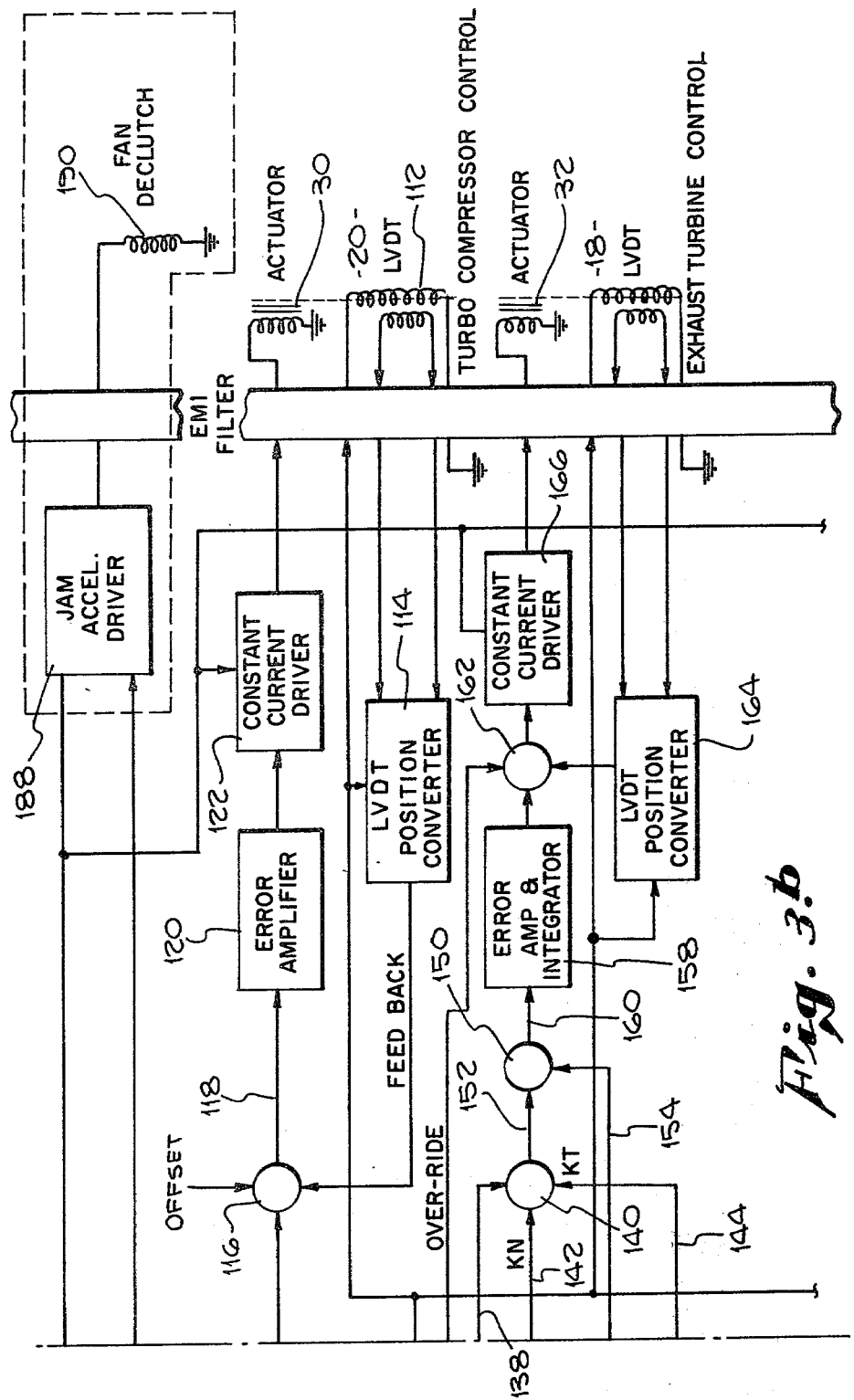
Fig. 3.b

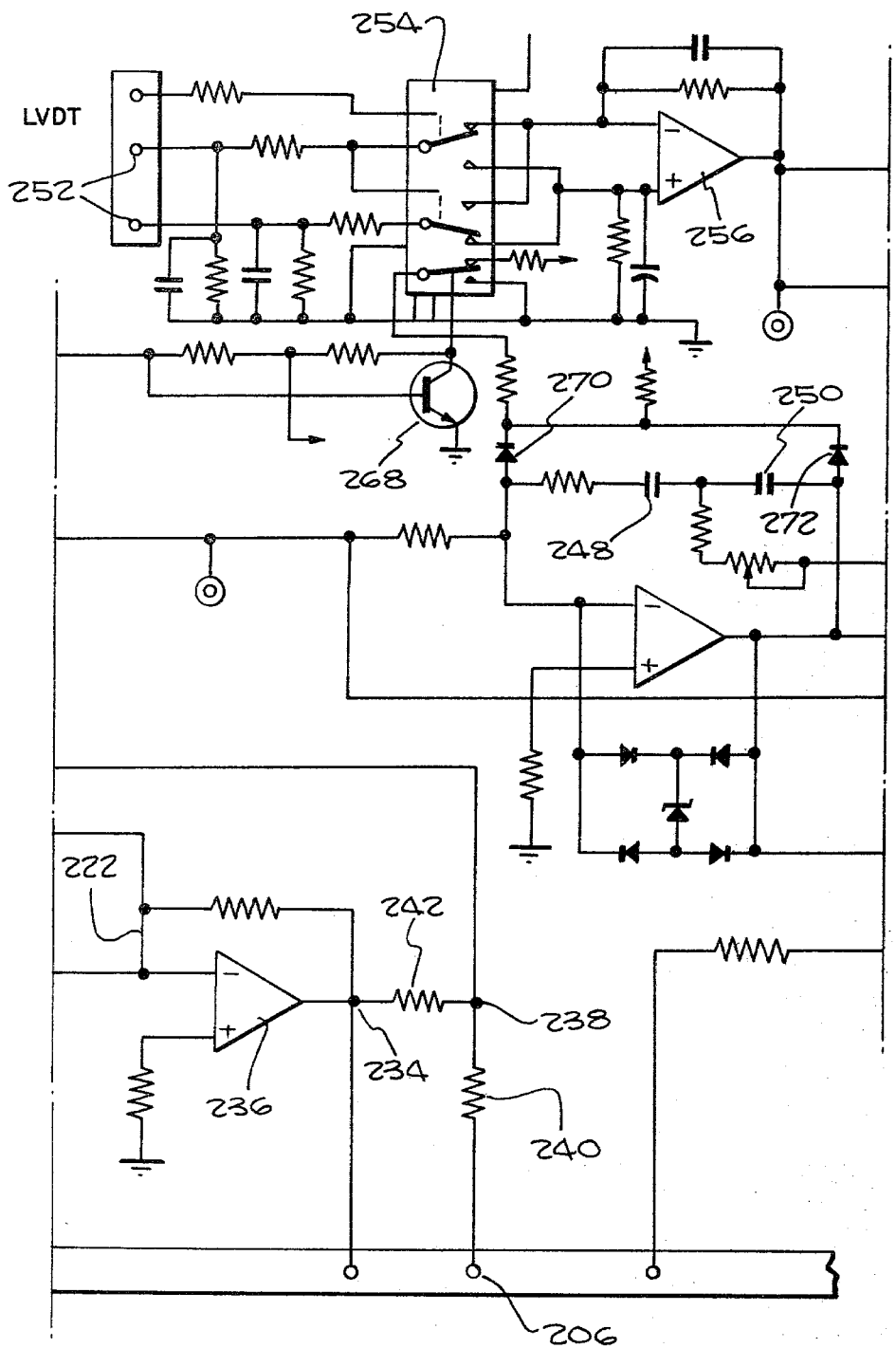
Fig. 6.b

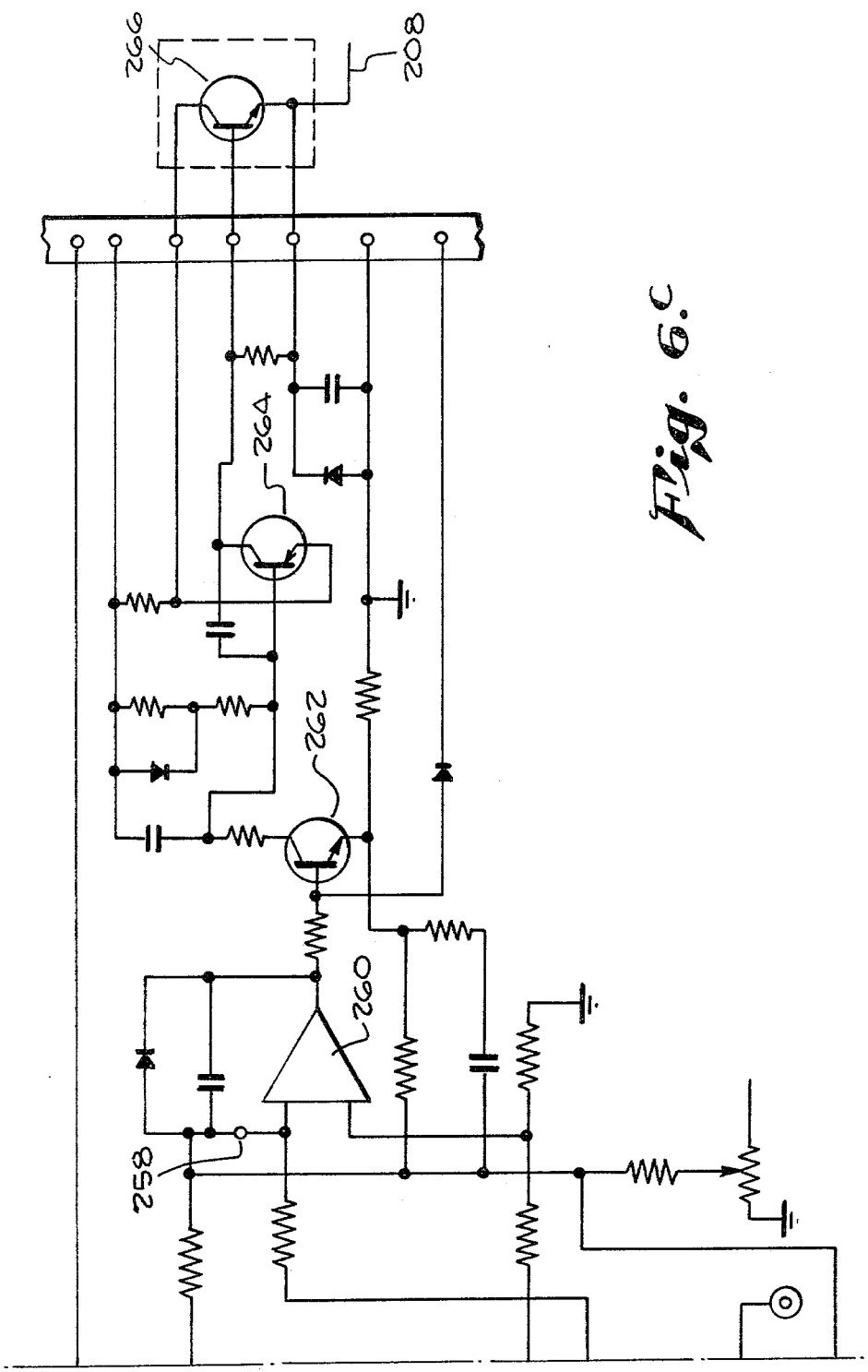
Fig. 6.c

TURBOCHARGER CONTROL SYSTEM

BACKGROUND OF THE INVENTION

This invention relates to turbocharger control systems.

It is known that increasing the pressure of the air supplied to an internal combustion engine will increase the horsepower output, and various types of supercharging and turbocharging arrangements have previously been proposed for internal combustion engines.

However, there are a number of factors which go into the optimum operation of a turbocharger or a supercharger. Thus, for example, when a turbocharger is operated by the hot exhaust gases from an engine, the back pressure on the engine is increased, and the efficiency of the engine is thereby reduced somewhat as a result of this increased back pressure. In addition, the compressor of a turbocharger must not be overdriven. More specifically, above a certain rate of rotation, with the diffuser vanes in a predetermined orientation or configuration, the compressor will reach an undesired condition in which cavitation, or "surge" may occur, if the compressor speed is not in keeping with the appropriate mass flow rate for that given compressor speed and configuration or geometry. Under these conditions the compressor may suffer mechanical damage. This undesired phenomenon occurs at a driving speed which is only slightly above the optimum operating point of the compressor. Up to the present time, although superchargers and turbochargers have been employed, they have generally not been operated at the optimum operating points for highest overall engine efficiency; but instead, the superchargers have generally either been operated at a relatively low efficiency region where only a portion of the potential increase in horsepower has been realized, or at such a high level that intermittent cavitation or other failure of the supercharger to supply additional air to the intake manifold occurs. In other prior systems, using what is known as "waste-gate controls" a significant portion of the engine exhaust gases have been selectively diverted to the atmosphere to control the turbocharger rotational speed. Such controls waste a portion of the available energy which could otherwise be utilized for useful purposes. Accordingly, the very significant potential of turbochargers, which can increase engine power by in the order of sixty (60%) percent when optimally employed, has generally not been realized.

A principal object of the present invention is therefore, to provide a control system for the operation of a turbocharger whereby the diesel engine and turbocharger combination is efficiently operated at close to the maximum power output capability throughout the full power operating range of the engine, but safely below the "cavitation" or "stall" region of the compressor, whereby reliable high efficiency and high power operation is achieved. A subordinate object of the present invention is to accomplish the foregoing with a simple and reliable electronic circuit implementation.

SUMMARY OF THE INVENTION

In accordance with the present invention, an internal combustion engine provided with a turbocharger has a control circuit which separately controls the vanes in the turbine section and in the compressor section of the turbocharger. Further, means are provided for sensing the engine speed, and conditions in both the turbine and the compressor, and adjusting the vanes in both the turbine and compressor sections to approach closely to the optimum operating conditions for the turbocharged engine throughout its power operating range, without entering the region of compressor instability or increasing back pressure losses.

In accordance with a feature of the present invention, actuators are provided for both the compressor and the turbine sections of the turbocharger for adjusting the coupling between the gases and the blades in both the compressor and turbine sections; the compressor actuator is operated generally linearly with engine speed, and the turbine actuator is operated as a function of engine output power to maintain the optimum or desired input manifold pressure, safely below the "stall" or "cavitation" regions for both the turbine and the compressor.

In accordance with a specific illustrative embodiment of the invention, the compressor control vanes or are actuated in accordance with a function of the speed of the engine, and on a subordinate basis as a function of the inlet manifold pressure. The position of the turbine vanes is controlled by a circuit which calculates from the exhaust temperature, and from the speed of the engine, the theoretical or desired input manifold pressure, and compares the calculated value with the actual input manifold pressure. The error signal is then integrated and supplied to the vane actuator. The position of the vanes is sensed, and compared with the desired position for achieving the appropriate input manifold pressure, and an error signal of the proper sign is supplied to the integrator. The calculated optimum input manifold pressure is a non-linear function of temperature and engine speed, and may include a product term, and arrangements are provided to adjust the coupling between the turbine blades and gases accordingly.

In addition, an override signal or "jam" acceleration signal may be employed for increasing the turbocharger output for sudden bursts of power.

In accordance with a feature of the invention, the turbocharger system is kept running at maximum speed even when the engine is idling so that, when a "jam acceration" demand is made (maximum power demand), the turbocharger does not have to take the time to accelerate to the maximum speed to start performing (because the turbosystem is already running at the maximum speed) and therefore an immediate response is achieved.

Other objects, features, and advantages of the invention will become apparent from a consideration of the following detailed description and from the accompanying drawings.

BRIEF DESCRIPTION OF THE DRAWINGS

FIG. 1 is a block schematic diagram illustrating the principles of the present invention;

FIG. 2 is a cutaway showing of a turbocharger having a turbine driving section and a compressor section, which may be employed in the implementation of the invention;

FIGS. 3a and 3b are block circuit diagrams showing one implementation of the control circuitry of the present invention;

FIGS. 6a–6c are schematic circuit diagrams of a portion of the control circuit shown in block diagram form in FIG. 3.

DETAILED DESCRIPTION

Figure 4:
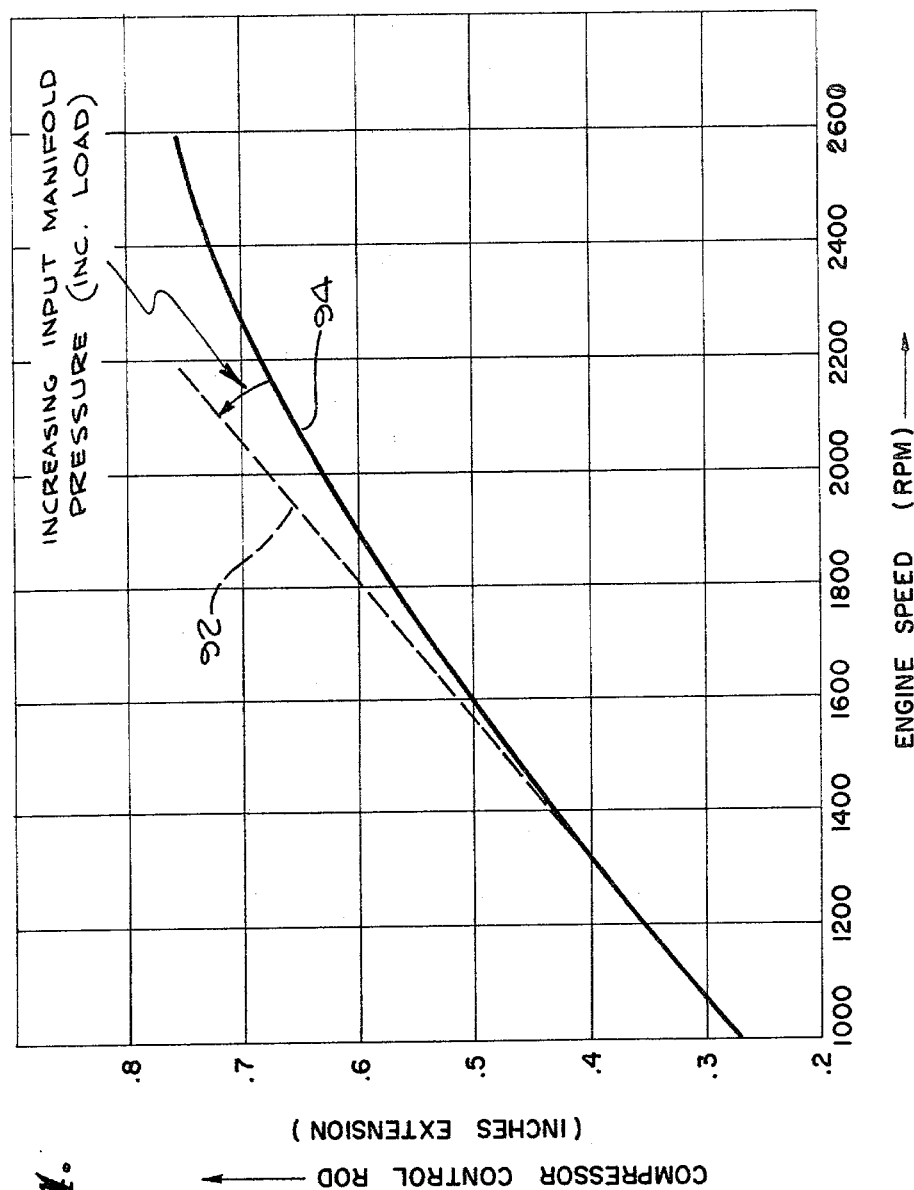
FIGS. 4 and 5 are plots relating the control rod position to the engine parameters, For the compressor section and for the turbine section, respectively, of the turbocharger of FIG. 2.

Referring to FIG. 1 of the drawings, a large diesel engine 12 is represented by the block at the center of the drawing. This diesel engine may, for example, be an air-cooled V-12 model VCR1790, produced by Teledyne Continental Motors. The turbochargers 14 and 16 are associated respectively with the two banks of cylinders of the V-12 engine. For convenience, the following discussions will relate primarily to one of the two turbochargers, but it is to be understood that the corresponding circuitry and apparatus associated with the other turbocharger is comparable.

The turbocharger 14 includes a turbine section 18 which supplies power to drive the compressor section 20. More specifically, exhaust gases are applied to the turbine 18, as indicated by the arrow 22, and after expanding and performing useful work within the turbine 18, the resultant gases are expelled from turbine 18 as indicated by the arrow 24. The compressor 20 takes in air from the atmosphere as indicated by the arrow 26, compresses it, and supplies it to the diesel engine input manifold 28 at a pressure of up to several atmospheres.

Both the turbine section 18 and the compressor section 20 of the turbocharger 14 are provided with movable vanes which may be adjusted in their air passage area or the angle at which they receive air from the rotating blades, or direct air onto them, in order to more powerfully couple to the gases which pass through these sections of the turbocharger. The position of the coupling vanes is adjusted by a control rod associated with each turbocharger section; and the position of each of these control rods is determined by the electrohydraulic actuators 30 and 32, which adjust the position of the control rods for the compressor 20, and the turbine 18, respectively.

Control signals to the actuators 30 and 32 are provided by the control circuit 34. Input signals to the control circuit 34 are indicated by dashed lines leading to this block. More specifically, on lead 36, a signal is supplied which indicates the pressure at the intake manifold 28 to the upper bank of cylinders of the diesel engine 12. Similarly, the lead 38 supplies a signal to the control circuit 34 which represents the temperature at the exhaust manifold from the diesel engine 12 entering the turbine section 18. Signals representing the speed of rotation of the diesel engine 12 are supplied on leads 40, 42, and 44 to the upper control circuit 34 and to the lower control circuit 46. The common power supply and other circuitry which supplies signals to both control circuit 34 and 46, is represented by the block 48 in FIG. 1.

Incidentally, the position of the actuators 30 and 32 is fed back to the control circuit 34 by suitable linear variable displacement transformers, with the feedback circuit being indicated by the leads 52 and 54 in FIG. 1.

The actuators for the compressor and the turbine associated with control circuit 46 for the second cylinder bank are designated by the reference numerals 56 and 58, respectively.

Now, turning to FIG. 2, it shows in a partially cutaway view, the supercharger 14, with its turbine section 18 to the right and the compressor section 20 to the left. Fresh air enters the compressor section 20 from the left as indicated by arrow 62 and leaves the compressor section 20 through the fitting 64, as indicated by the arrow 66.

Hot exhaust gases from the diesel engine are supplied through the input fitting 68, as represented by the arrows 70. As these gases expand and pass through the turbine section 18, they impinge on the blades or vanes 72, causing the rotation of a shaft 74 which extends from the turbine section 18 through to the compressor section 20 and drives the blades 76 which are located within the compressor section of the turbocharger 14. After useful work is extracted from the hot gases supplied from the diesel engine, these gases are exhausted through the fitting 78, as indicated by the arrow 80. In some cases, these hot gases may be routed to a secondary load coupled power turbine.

In the compressor 20, the air from the rotating blades 76 is coupled to the output fitting 64 by the peripheral conical manifold 65, and by the variable angle vanes 67, which determine the area and closeness of coupling of air supplied to the engine. In a similar manner the angle of the vanes 69 control the coupling of the exhaust gases to the turbine blades 72.

In a manner known per se, in the turbine and compressor field, the angle of the turbine vanes 69 and the compressor vanes 67 may be varied as desired through an external control rod. In the case of the compressor section, the control rod serves to shift the position of the ring 82, and this changes the angle and the relative exposure of the vanes 67 so that the compressor has more vane area exposed to drive the air into the diesel engine.

It is noted in passing that the turbine section 18 of the particular turbocharger shown in FIG. 2 merely operates on the basis of the hot exhaust gases which are forced through the unit, and the energy supplied as these gases expand and cool off. It is to be understood, that the turbine section could, if desired, be supplied with additional fuel so that it could be operative even when the diesel engine itself it not supplying hot gases through the input fitting 68. Of course, the turbine blades 72 and the other parts included in the turbine unit 18 would be of somewhat different configuration and would probably be of higher temperature resistant materials to withstand the higher temperatures present with direct combustion in the turbine, and an alternative air input would be provided.

Incidentally, the turbocharger as shown in FIG. 2 is understood to be available with the VCR1790 diesel engine, from Teledyne Continental Motors.

Figure 5:
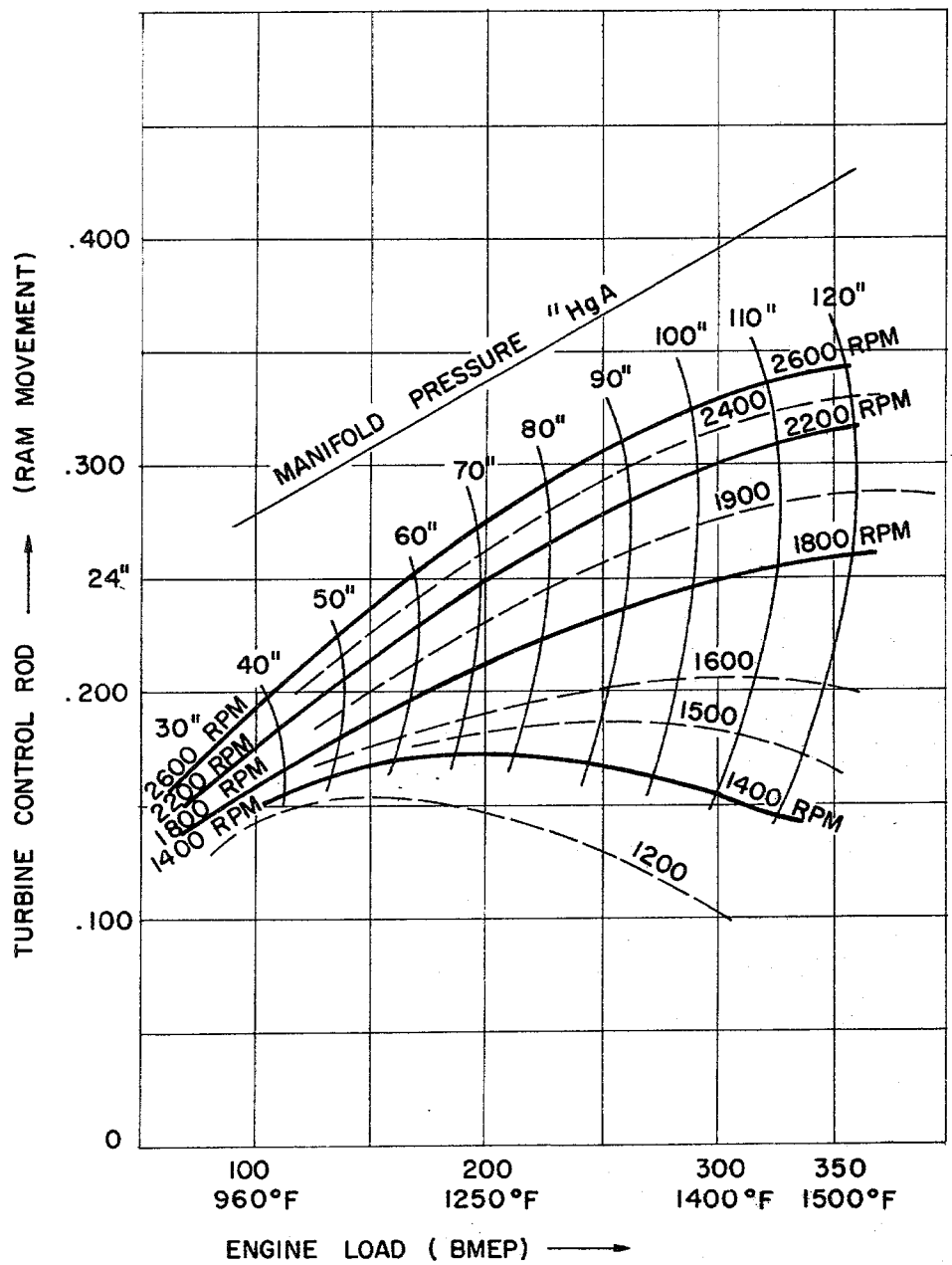

The block circuit diagram of FIG. 3 will now be considered in combination with the plots of FIGS. 4 and 5. In FIG. 3, the compressor control unit 20 and the turbine control unit 18 are shown at the right-hand side. The inputs by which the actuators 18 and 20 are controlled, include the engine speed indicated schematically at 86 at the upper left-hand area of the drawing, the diesel engine input manifold pressure at input lead 88, and the inlet temperature signal supplied at 90, which of course is also the temperature of the exhaust gases from the diesel engine.

The operation of the actuator for the compressor control rod which adjusts the vanes 67 is in accordance with the somewhat simpler function shown in FIG. 4, so it will be considered first. As mentioned above, the actuator 20 controls the position of the compressor vanes 67 while the actuator 18 controls the orientation of the turbine vanes 69 in accordance with the somewhat more complex "map" of FIG. 5.

Considering the function of FIG. 4, it may be noted that the control rod position is a substantially linear function of the speed, although it departs slightly from linearity at higher speeds. In addition, as represented by the dashed line 92 in the plot of FIG. 4, with increased manifold pressures accompanying increased loading, the control rod is actuated to a greater extent, by up to approximately ten percent (10%). Accordingly, the actuator 20 is primarily a direct function of the speed, but has a minor modification in accordance with the manifold pressure at the input to the diesel engine or at the output of the compressor to reflect load variations.

The speed and pressure signals are modified by constants in the form of potentiometers indicated by the blocks 96 and 98 and are combined in the circuit 100. The pressure signal P is supplied by the pressure sensor and amplifier circuitry designated 102 in FIG. 3. The speed signal N is obtained by the processing of the electromagnetically generated signal 86 by the input conditioning circuit 104, the frequency-to-voltage converter circuit 106, and the variable slope amplifier circuit 108. The desired position of the actuator is indicated at the output of the variable slope amplifier 110. The actual position of the actuator 20 is indicated by the signal supplied from the linear variable displacement transformer 112 following processing by circuit 114. The circuit 116 compares the desired position of the actuator 20 with its actual position and supplies an error signal on lead 118 to the error amplifier 120, which in turn modifies the output of the constant current driver 122 to change the position of the actuator 20 as needed to conform with the signal at the output of amplifier 110.

As indicated by FIG. 5, the desired position of the turbine actuator control rod is a somewhat more complex function of temperature, speed, and inlet pressure, than that required to operate the compressor control rod. More specifically, in the case of the turbine control rod, the temperature T and the speed N are initially modified by the potentiometers indicated by blocks 132 and 134, and then in a calculation performed by the circuit 136, the theoretical or desired engine input manifold pressure is calculated and supplied on lead 138 to the comparison circuit 140. Incidentally, in FIG. 5, the horizontal axis designated "BMEP", stands for "brake mean effective pressure", and generally corresponds to torque. The curved vertically extending lines represent inches of mercury at the input manifold.

From overall considerations, it is evident that the function required for actuating the turbine control rod, as indicated in FIG. 5, is substantially more complex than that required for operating the compressor control rod, as shown in FIG. 4. More specifically, the function involves a calculation of the desired or theoretical pressure which is of the following form:

$$P_c = C_1 T + C_2 + C_3 N + C_4 NT \quad (1)$$

Where $P_c$ is the calculated pressure, N is the speed, T is the temperature, and $C_1$, $C_2$, $C_3$, and $C_4$ are constants.

The final term of the foregoing equation (1) is developed in the multiplication circuit 136, and that term is supplied on lead 138 to the summing circuit 140. The terms which are direct functions of the speed and the temperature, are supplied on leads 142 and 144, respectively, from the attenuating circuits 146 and 148, respectively, which provide the proper magnitude for these functions. The calculated or desired pressure is supplied to the comparison circuit 150 on lead 152, and is compared with the actual pressure supplied to circuit 150 on lead 154, after suitable scaling by circuit 156. The error signal is supplied from circuit 150 to the error amplifier and integrator circuit 158 on lead 160.

The output from circuit 158 is supplied to the comparison circuit 162, where it is compared with the output from the linear variable displacement transformer position converter 164. The output from circuit 162 is supplied to the constant current driver 166, which in turn applies current to the turbine control rod actuator 18.

The circuit of FIG. 3 also includes a regulated inverter power supply 172 which is supplied from a 28-volt source through a transient protection circuit 174.

Also shown in FIG. 3 is the maximum or "jam" acceleration throttle arrangement. This includes the throttle switches 176 and 178, the timer circuit 180, the flip-flop 182, and the flip-flop control circuits 184 and 186.

The "Jam" acceleration function can only occur within 0.9 seconds after the throttle-idle switch 178 has been energized, indicating that the engine is being accelerated and that the throttle has been moved from the idle position to supply more fuel to the engine. The "Jam" acceleration switch 176, which is coupled to the throttle (and is operated in a manner similar to the "passing" switch on certain car accelerator gas pedals) supplies one input to the AND gate 184, and the other input to the AND gate 184 is also energized during the first 0.9 seconds after the accelerator switch 178 is closed. Under these conditions the "JAM" flip-flop 182 is "set" and a maximum acceleration output signal is supplied on lead 183 to the "JAM" acceleration driver 188 and to the circuit 162 in the turbine actuator circuit. The output from the driver 188 is applied to coil 190 which de-clutches the engine cooling fans which draw substantial power during normal engine operation. The override signal supplied from lead 183 to combining circuit 162 energizes the actuator associated with the turbine section 18 of the turbocharger, and shifts it rapidly toward supplying higher pressures to the input manifold. The clear input 185 resets the flip-flop 182 to its normal state after four seconds, to preclude shifting the turbocharger into the undesired "stall" or "cavitation" mode. Incidentally, the "AND NOT" circuit 186 resets the flip-flop 182 as soon as the "JAM" or maximum acceleration switch 176 is opened.

Figure 6A:
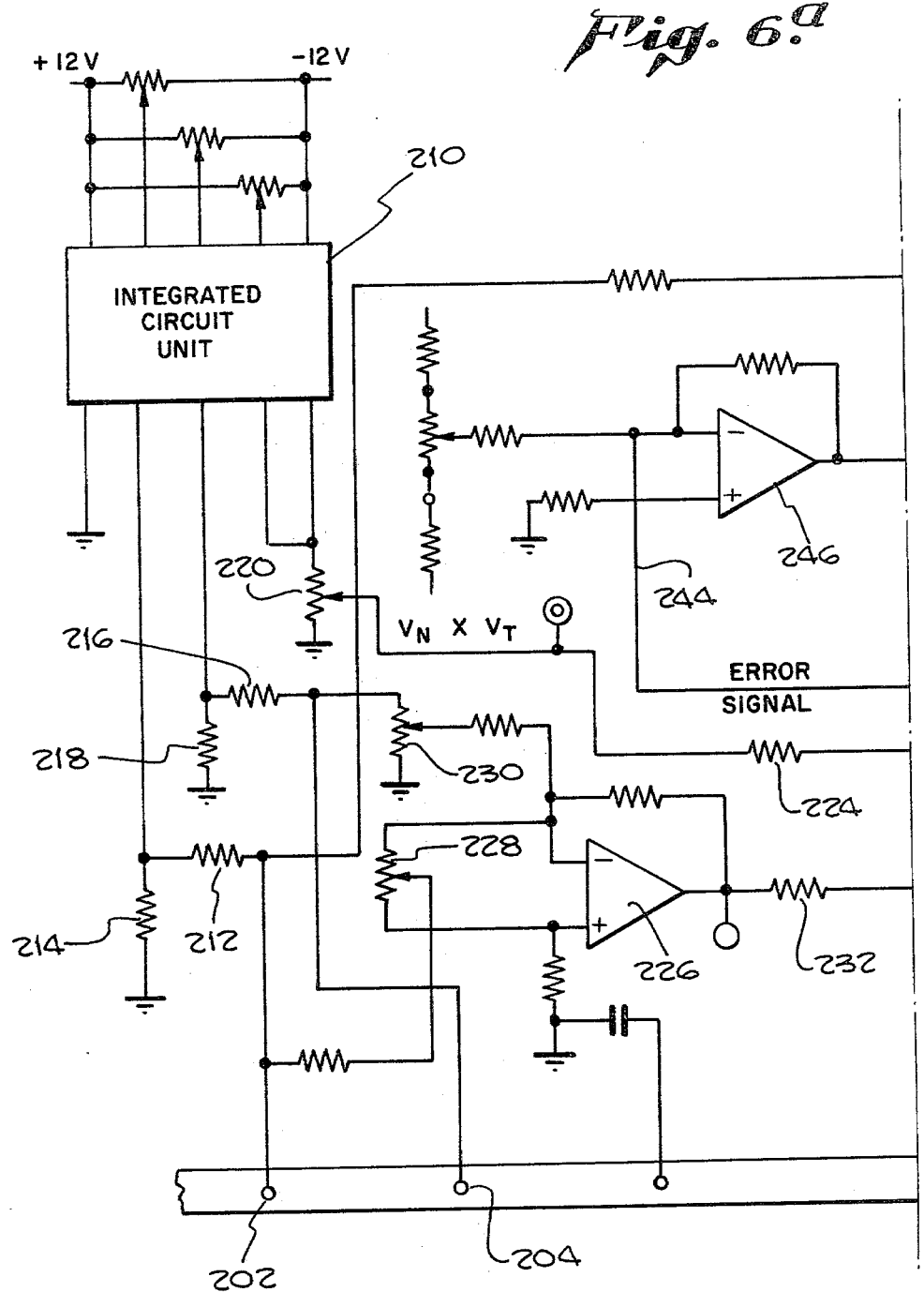

FIG. 6 is a circuit diagram which shows the control circuitry for implementing Equation (1), and for controlling the turbine actuator, in some detail. In FIG. 6 the speed input is supplied to terminal 202, the temperature input to terminal 204, and the actual input manifold pressure to terminal 206. The lead 208 at the far right in FIG. 6 is connected to the actuator 18 for driving the turbine control rod. The multiplication function accomplished by block 136 in FIG. 3 is performed by the integrated circuit unit 210 in FIG. 6. This function may be implemented by Part No. AD533SD, an integrator circuit available from Analog Devices. The speed signal is supplied to the multiplier 210 through the resistive network including resistors 212 and 214 and the temperature signal is supplied to the multiplier 210 through the network including the resistors 216 and 218. The product of the speed and temperature signals is adjusted in level by the potentiometer 220, and is supplied to summing point 222 through the resistor 224. The additive speed and temperature factors are combined in the operational amplifier 226 after being appropriately scaled in the potentiometers 228 (speed), and 230 (temperature). The output from the operational amplifier 226 is supplied to summing point 222 through the resistor 232. The actual manifold pressure at point 206 and the desired or calculated optimum manifold pressure at point 234 at the output of operational amplifier 236 are combined out of phase so that the error signal appears at the junction 238 of resistors 240 and 242. This error signal is applied on lead 244 to the amplifier 246, and the output is integrated in the circuitry including the capacitor 248 and 250.

The output from the linear variable displacement transformer associated with the turbine actuator 18 is supplied to the terminals 252, which appear toward the top of FIG. 6. The switching circuitry 254 serves to convert the output from the LVDT to a variable amplitude DC voltage, at the output from the amplifier 256. The actual position of the turbine actuator 18 is summed with the output from the integrator, at the summing point 258, and the resultant voltage is employed to shift the position of the actuator, with the difference signal being amplified by the operational amplifier 260 and additional stages of amplification including that provided by the transistor 262 and the two additional transistors 264 and 266, which together provide additional current amplification of approximately 50. The resultant signal is applied to the turbine actuator over the output lead 208.

Also included in FIG. 6 is a speed control circuit which disables the integrator until the engine reaches a speed of at least 1000 RPM. This is accomplished by the transistor 268 which is turned on at low speeds and is switched to the "off" state at engine speeds above approximately 1000 RPM. When the transistor 268 is "on", the diodes 270 and 272 are biased to their low resistance states, and short circuit the integrator capacitors 248 and 250. However, when the transistor 268 is turned off, the diodes 270 and 272 are biased in their reverse or high resistance direction, and the integrator, including the capacitors 248 and 250, enters its normal operating state.

The remaining circuit components shown in FIG. 6 are generally conventional, are commercially available and therefore will not be described in detail. For example, the operational amplifiers may be implemented by Part No. LN124 available from National Semiconductor.

For completeness, reference is made to U.S. Pat. No. 2,341,974 which shows a different form of Supercharger Control. It may also be noted that the actuators associated with the turbine and the compressor sections of the supercharger may be implemented by Remote Proportional Actuator Model SA 1205-03-00, manufactured by Dynex Controls Division of Applied Power Inc., Pewaukee, Wisconsin, 53072.

In conclusion, it is to be understood that the disclosed system is merely illustrative of the principles of the present invention. Thus, by way of example, and not of limitation, when other superchargers or turbochargers and engines are employed, other characteristics for the turbine and the compressor sections of the system will be present, and the circuitry would, of course, be modified to operate these systems at their optimum points, without encountering "stall" or "cavitation" in the compressor. In addition, when desired, the turbine section may be supplied with fuel and operated as a "mini" power supply to run cooling, ventilating, or other functions, without the need for full operation of the major internal combustion power plant. Also, the optimum input manifold pressure could be determined as a function of engine power from inputs other than temperature and speed; these alternative inputs could, for example, be engine torque, fuel flow, or a fuel demand take-off lever. Accordingly, it is to be understood that the present invention is not limited to that precisely disclosed in the present specification and drawings.

What is claimed is:

1. A control system for a diesel engine having a turbocharger with a turbine section operated by the exhaust gases from said engine, and a compressor section powered by said turbine section for supplying air to the inlet manifold of said engine, and including means for variably controlling the flow of the gases passing through both the turbine and the compressor sections of said turbocharger, and means for independently adjusting the variable controlling means for said compressor and said turbine sections, comprising:

first and second actuators for shifting the variable controlling means for the gases passing through said compressor and said turbine sections, respectively;

electronic circuit means for controlling said first compressor actuator in accordance with a substantially linear function of the speed of the engine, and with an incremental additional actuation in accordance with the inlet manifold pressure;

electronic circuit means for controlling said second, turbine actuator in accordance with the theoretical optimum or desired engine input manifold pressure as derived from the speed of the engine and the temperature at the input of the turbine, modified by an error signal obtained by comparing the actual manifold pressure with the derived manifold pressure, whereby said turbine and compressor are operated just below "stall" or "cavitation" conditions, whereby substantially optimum operation is achieved; and said turbine actuator controlling means including circuitry responsive to the product of the speed and the temperature for determining the theoretical engine input manifold pressure.

2. A control system for an engine having a turbocharger with a turbine section and a compressor section powered by said turbine section for supplying air to the inlet manifold of said engine, and including means for variably controlling the flow of gases passing through both the turbine and the compressor sections of said turbocharger, and means for independently adjusting the variable controlling means for said compressor and said turbine sections, comprising:

first actuator means for shifting the variable controlling means for the gases passing through said compressor sections of said turbocharger;

second actuator means for shifting the variable controlling means for the gases passing through said turbine section of said turbocharger;

electronic circuit means for controlling said first compressor actuator in accordance with a substantially linear function of the speed of the engine;

electronic circuit means for controlling said second, turbine actuator in accordance with the theoretical optimum or desired engine input manifold pressure as a function of the power output of said engine to operate said turbine and compressor just below "stall" or "cavitation" conditions, whereby substantially optimum operation is achieved; and said turbine actuator controlling means including circuitry responsive to the product of the speed and the temperature for determining the theoretical engine input manifold pressure.

3. A control system for an engine having a turbocharger with a turbine section and a compressor section powered by said turbine section for supplying air to the inlet manifold of said engine, and including means for variably controlling the flow of gases passing through both the turbine and the compressor sections of said turbocharger, and means for independently adjusting the variable controlling means for said compressor and said turbine sections, said engine having a cooling fan and associated clutch means for actuating said cooling fan, comprising:

first actuator means for shifting the variable controlling means for the gases passing through said compressor sections of said turbocharger;

second actuator means for shifting the variable controlling means for the gases passing through said turbine section of said turbocharger;

electronic circuit means for controlling said first compressor actuator in accordance with a substantially linear function of the speed of the engine;

electronic circuit means for controlling said second, turbine actuator in accordance with the theoretical optimum or desired engine input manifold pressure as a function of the power output of said engine to operate said turbine and compressor just below "stall" or "cavitation" conditions, whereby substantially optimum operation is achieved;

means included in said electronic circuit means for changing the control signal applied to said turbine actuator and maintaining desired operating conditions substantially continuously as the speed of said engine varies; and maximum acceleration electronic control means for declutching the engine cooling fan and for overriding said turbine actuator control circuitry and rapidly increasing the flow in the turbine section of the turbocharger, thereby increasing the input manifold pressure.

4. A control system as defined in claims 1, 2, or 3 wherein each of the variable controlling means includes a set of angularly adjustable vanes.

* * * * *